United States Patent
Domanico et al.

(10) Patent No.: US 7,018,196 B2
(45) Date of Patent: Mar. 28, 2006

(54) SKIRT FORMING MEMBER FOR VACUUM-FORMING SYSTEMS

(75) Inventors: Mark Wayne Domanico, Naperville, IL (US); Charles Bernard Whitt, Villa Park, IL (US)

(73) Assignee: Luxury Bath Liners, Inc., Glendale Heights, IL (US)

( * ) Notice: Subject to any disclaimer, the term of this patent is extended or adjusted under 35 U.S.C. 154(b) by 145 days.

(21) Appl. No.: 10/178,069

(22) Filed: Jun. 21, 2002

(65) Prior Publication Data
US 2003/0235637 A1    Dec. 25, 2003

(51) Int. Cl.
*B29C 51/30* (2006.01)
(52) U.S. Cl. .................. 425/403; 249/159; 425/384
(58) Field of Classification Search ............... 425/403, 425/383, 384; 249/159
See application file for complete search history.

(56) References Cited

U.S. PATENT DOCUMENTS

| | | | | |
|---|---|---|---|---|
| 3,874,203 A | * | 4/1975 | Bookout ................... 70/137 |
| 4,465,453 A | * | 8/1984 | Turner et al. ............. 425/384 |
| 4,557,684 A | * | 12/1985 | Romine et al. ........... 425/383 |
| 4,729,541 A | * | 3/1988 | Maier ........................ 249/18 |
| 4,744,848 A | * | 5/1988 | Andrews et al. .......... 156/224 |
| 5,468,139 A | * | 11/1995 | Stender ..................... 425/383 |

OTHER PUBLICATIONS

Webster's Ninth New Collegiate Dictionary, 1985, Merriam-Webster, p. 298.*

* cited by examiner

*Primary Examiner*—Duane Smith
*Assistant Examiner*—Emmanuel S. Luk
(74) *Attorney, Agent, or Firm*—Factor & Lake

(57) ABSTRACT

A customizable skirt-forming member is disclosed, for use in high stress acrylic tub formation operations. The member generally has a rigid forming wall, at least one adjustable wing hingeably associated with the forming wall, and means for altering the pitch of the at least one wing, relative to the sidewall, so as to simultaneously alter a hinge angle therebetween. The member allows for customized, angled formed front tubs to be formed, while ensuring that the stresses of system operation do not alter the intended angles.

A toggle-nut structure is additionally disclosed, which ensures the maintenance of the relative positions of the angled walls of the skirt-forming member.

12 Claims, 4 Drawing Sheets

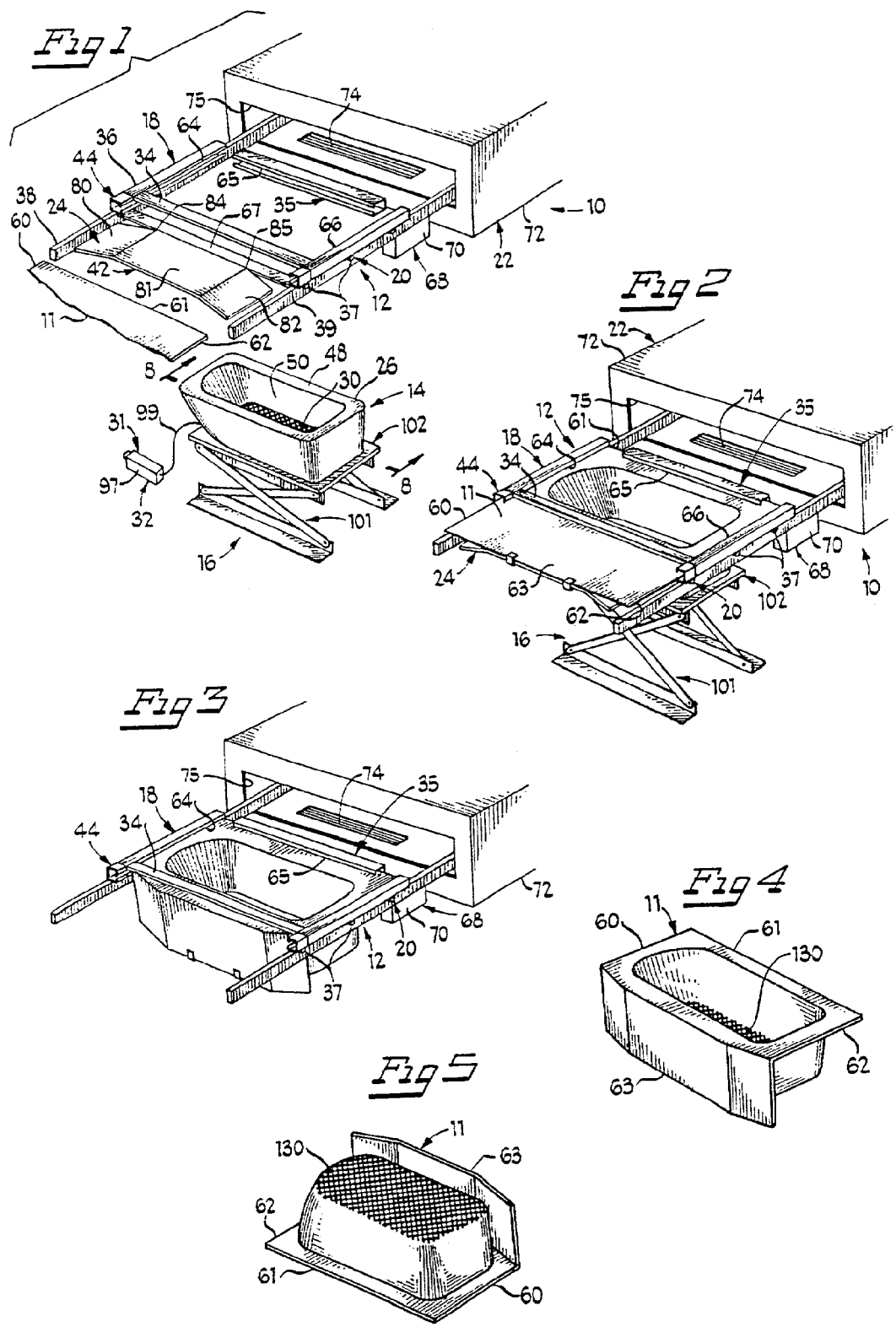

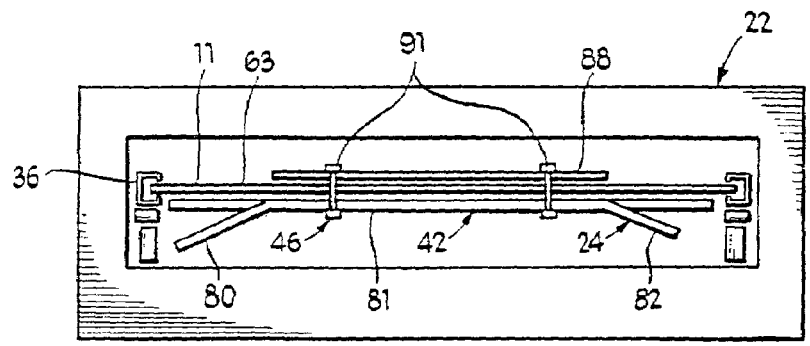
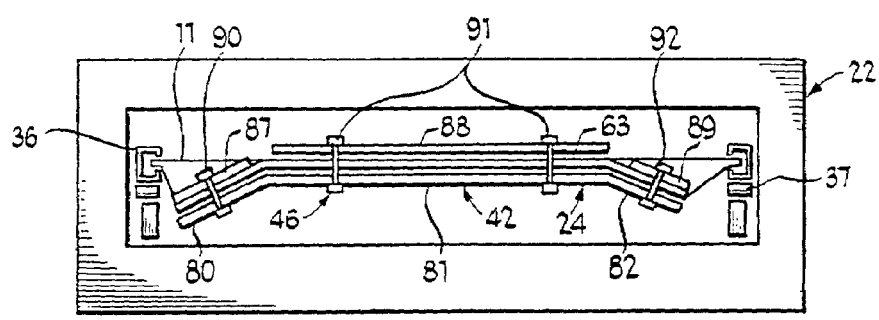
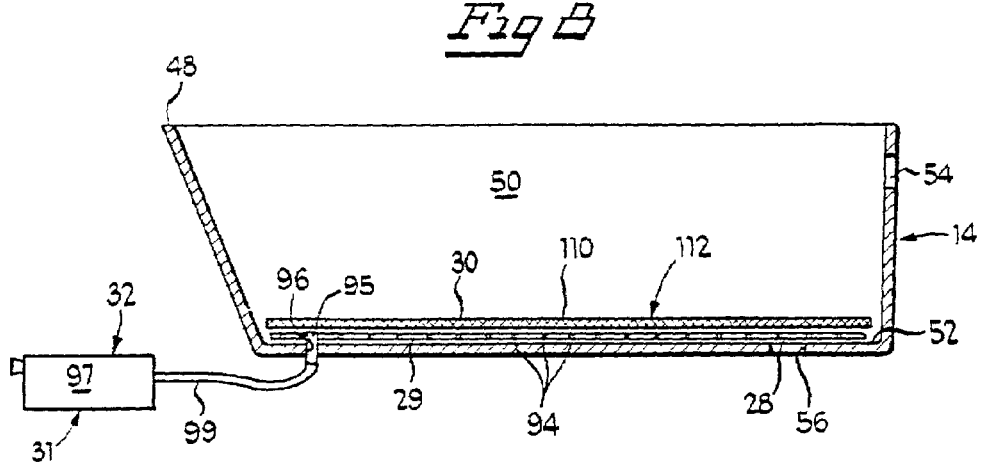

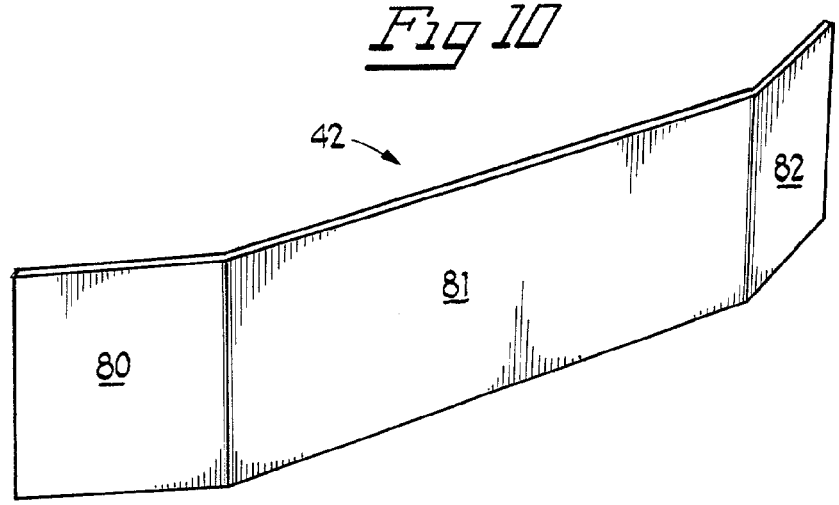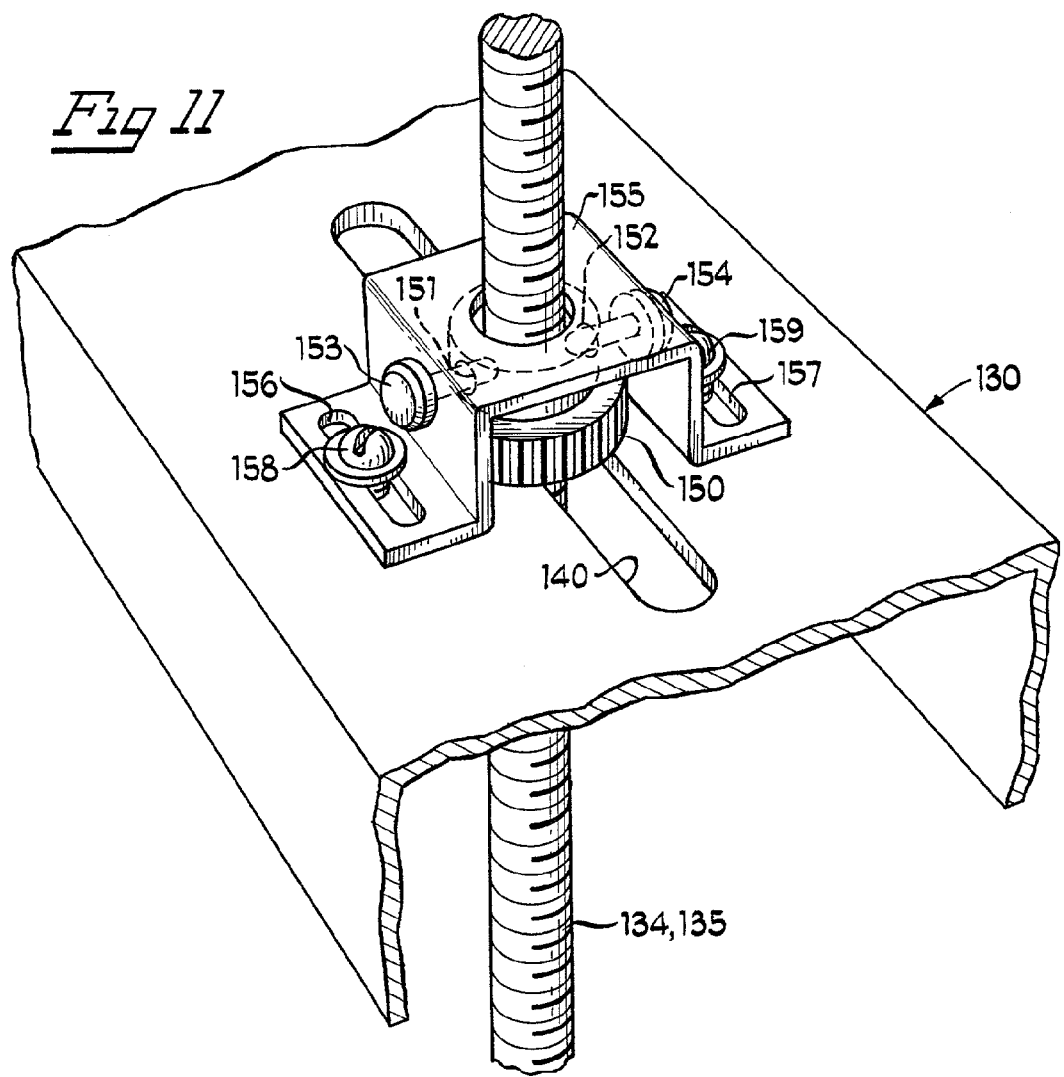

SKIRT FORMING MEMBER FOR VACUUM-FORMING SYSTEMS

BACKGROUND OF THE INVENTION

1. Field of the Invention

This invention is directed generally to bathtub and shower stall liners, and, more specifically, to an improved skirt forming member for use in systems for molding bathtub and shower stall liners.

2. Background Art

Lining devices for rejuvenating a bathroom have been around for many years. Bathtubs and shower stalls generally have a durable finish that is intended to last many years. However, after years of use, the porcelain or enamel over the iron surface of a bathtub may become damaged. Such damage may include abrasions, chips through the enamel exposing the underlying iron, and, rust that has permanently discolored the surface. At some point it becomes necessary to entirely replace the tub or stall.

Replacing a bathtub, especially in an older home, is prone to many problems. First, inasmuch as the tub was likely installed many years ago, it may be difficult to even loosen the tub such that it may be removed from the bathroom. Further, due to the many manufacturers over the years, many different tubs having different dimensions and surface features exist. As such, it may be difficult to find a replacement tub that has the same dimensions. Accordingly, the area may have to be redimensioned. Moreover, due to the durable construction of a tub, the costs associated with a tub replacement tend to make full replacement quite expensive.

To address the cost considerations, certain tubs have been constructed from thermoplastic materials. For example, these tubs do not solve all of the problems associated with tub replacement. While the cost of these thermoplastic tubs is substantially less than a new porcelain or enamel tub, they are structurally weaker and are prone to stress failures and fractures. Further, they do not come in a variety of dimensions such that, after the old tub is removed, reconfiguration of the bathroom area may still be necessary.

An invention was previously disclosed in U.S. Pat. No. 5,814,270, which addressed many of the above problems. In that invention, a device and method for vacuum-forming bathtub and shower liners was discussed, teaching, among other things, the formation of a new liner that virtually matches an existing tub structure. As a result of the device, liners were able to be produced that eliminated the problems associated with removal of the old bathtubs, as well as the problems associated with finding a bathtub that is properly dimensioned. Further, as the old tub still formed the structural component of the bathtub, the potential for problems related to stress, strain and torsion were greatly reduced, if not eliminated.

Despite these improvements, the system disclosed in U.S. Pat. No. 5,814,270, did not eliminate all problems associated with liner installations. Specifically, that patent taught the use of a rigid skirt-forming member that was capable of producing cosmetic, angled-front tub walls. However, due to the rigid nature of the device member that formed the angled walls, those angles could not be altered to account for various bathroom conditions. For example, bathroom dimensions often require a variety of angles to be used for the tub walls, either for cosmetic reasons or for practical ones. One such reason might be the presence of a shorter, non-standard bathtub length, wherein the angles of the standard wall would have to return more steeply in order to conform with the shorter length.

Accordingly, it is an object of this invention to demonstrate a device capable of forming bathtub insert sidewalls with customized angles.

It is additionally an object of this invention to teach a structure of such a device capable of withstanding the high pressures associated with vacuum formation.

These and other objects will become apparent in view of the present specification, Claims and Drawings.

BRIEF DESCRIPTION OF THE DRAWINGS

For a better understanding of the present invention, reference may be had to the accompanying drawings in which:

FIG. 1 of the drawings is a perspective view of the present bathtub or shower stall liner formation machine, prior to the positioning of the formable member;

FIG. 2 of the drawings is a perspective view of the liner formation machine, after the heating and the beginning the formation of the formable member;

FIG. 3 of the drawings is a perspective view of the liner formation machine, after the rotation of skirt forming member;

FIG. 4 of the drawings is a perspective view of the formed formable member;

FIG. 5 of the drawings is a perspective view of the underside of the formed formable member, showing in particular the slip prevention means;

FIG. 6 of the drawings is a front plan view of the liner formation machine, showing in particular the partial clamping of the skirt member;

FIG. 7 of the drawings is a front plan view of the liner formation machine, showing in particular the full clamping of the skirt member;

FIG. 8 of the drawings is a cross-sectional view of the plumbing apparatus, taken generally along line 8—8 of FIG. 1;

FIG. 10 of the drawings is a perspective view of the adjustable skirt forming panel showing the front of the forming panels; and FIG. 11 of the drawings is a perspective view of the toggle-bolt assembly.

SUMMARY OF THE INVENTION

Figure 9:
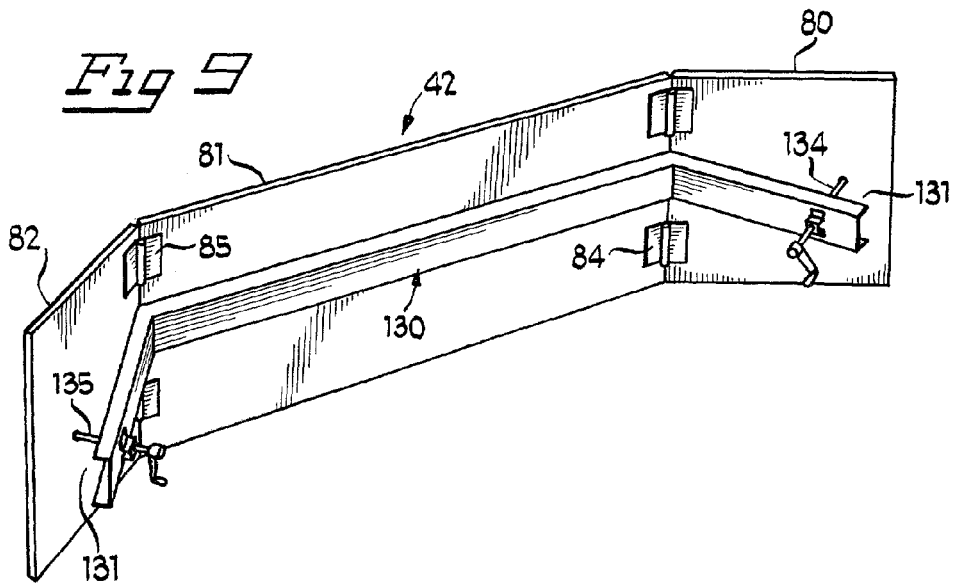
FIG. 9 of the drawings is a perspective view of the adjustable skirt-forming panel showing the support structure.

The present invention is drawn to a customizable skirt-forming member. The skirt forming member has a rigid forming wall, at least one adjustable wing hingeably associated with the forming wall, and means for altering the pitch of the at least one wing, relative to the sidewall, so as to simultaneously alter a hinge angle therebetween. In order to better support the adjustable wings during high-stress formation operations, it is preferably that the device additionally comprise a support member affixed to a rear side of the sidewall, wherein the support member extends outwardly from and at a support angle to the sidewall. This support member limits the angle that the at least one adjustable wing can bend so that the hinge angle cannot be greater than the support angle.

In a preferred embodiment, the altering means comprises at least one support bolt affixed to the at least one adjustable wing on a first end, and extending to and through the support member on a second end. In order to better support the at least one adjustable wing, it is also preferred that the invention additionally comprise a sliding toggle nut affixed to and securing the second end of the support bolt at the support member. In order to provide easy adjustment, as well as optimum cosmetic effects, it is preferred that the at least one adjustable wing have a back side and a forming side, wherein the support bolt extends through the back side, and is counter-sunk into the forming side.

Although it is possible to have a forming member, as described above, with at least one adjustable wing only, it is preferred that the at least one adjustable wing comprises two adjustable wings on distal ends of the forming wall, and that the two adjustable wings comprise a first adjustable wing and a second adjustable wing, wherein the pitch of both the first wing and the second wing may be independently altered.

The present invention is additionally directed to a toggle nut structure for use in high pressure forming operations, the nut comprising a suspension member associated with a support structure, a nut having at least two suspension holes on opposing sides; and at least two suspension pins, wherein the suspension pins are substantially free of threads wherein the at least two suspension pins pass through the suspension member and are inserted into the at least two suspension holes, securing the vertical position of the nut relative to the suspension member, while allowing the nut lateral movement.

DETAILED DESCRIPTION OF THE INVENTION

While this invention is susceptible of embodiment in many different forms, there is shown in the drawings and will herein be described in detail, a specific embodiment with the understanding that the present disclosure can be considered as an exemplification of the principles of the invention and is not intended to limit the invention to the embodiments illustrated.

Bathtub or shower stall liner vacuum forming system 10 is seen in FIG. 1 and FIG. 2 as comprising formable member 11, liner vacuum machine 12, plumbing apparatus 14 (FIG. 8) and plumbing apparatus movement means 16. Formable member 11 (FIG. 1, FIG. 4 and FIG. 5) comprises a thermoplastic panel having edges 60, 61, 62 and skirt region 63. Preferably, the formable member comprises a co-extruded ABS thermoplastic sheet having uniform thickness, however other configurations and materials are also contemplated. Liner vacuum machine 12 comprises means 18 for releasably retaining formable member 11, means 20 for positioning the formable member, means 22 for heating the formable member and means 24 for forming a skirt member.

Releasable retaining means 18 is seen in FIG. 1, FIG. 2 and FIG. 3 as comprising frame member 35, hydraulic clamps, such as hydraulic clamp 36, and flat plate member 34. Frame edge members 64, 65 and 66 and frame support member 67 (FIG. 1) are dimensioned to receive edges 60, 61, 62 and skirt region 63 of formable member 11, respectively. Hydraulic clamps, such as hydraulic clamp 36, are positioned above frame member 35. The hydraulic clamps serve to clamp formable member at edges 60, 61, 62 to respective frame edge members 64, 65, and 66. Flat plate member 34 is positioned over skirt region 63 of formable member 11, and precludes inadvertent movement of skirt region 63 of formable member 11. Of course, manual clamps as well as alternative clamping structures are also contemplated to retain formable member 11 to frame member 35.

Positioning means 20 is seen in FIG. 1, FIG. 2 and FIG. 3 as comprising rolling members, such as rolling members 37, support beam members 38, 39 and driving means 68. The support beam members 38, 39 may be positioned in parallel, and at a distance similar to frame edge members 64, 66 respectively. Rolling members, such as rolling member 37, are associated with frame edge members 65, 66. Rolling members, such as rolling member 37, are positioned on frame edge members 64, 66, such that frame edge members 64, 66 form a track upon which the rolling members travel. Driving means 68 is operably associated with support beam members 38, 39 and with frame member 35. Driving means 68 facilitates rolling movement of frame member 35 relative to support beam members 38, 39. While driving means 68 may comprise electric motor 70, it is also contemplated that the driving means comprise an hydraulic movement system, or any other conventional driving systems, such as, among others, a mechanical leverage device operated by hand.

Heating means 22 comprises oven 72 having an opening 75, upper burners (not shown) and lower burners 74. Oven 72 is positioned so that the ends of support beam members 38, 39, reach into the oven (through opening 75) a sufficient distance, thus permitting placement of formable member 11 within oven 72. The upper burners and lower burners 74 are respectively positioned above and below opening 75 at a distance sufficient to evenly heat the formable member to a malleable temperature without burning or scalding any portions of the formable member. It is contemplated that oven 72 may comprise any conventional heating systems, such as natural gas fired or electric systems.

Skirt forming member 24 (which is used to form a front skirt of the molded liner) is shown in FIG. 1, FIG. 6, FIG. 7, FIG. 9 and FIG. 10 as comprising skirt forming panel 42, stretching means 44 (FIG. 1) and skirt clamping means 46. Skirt forming panel 42 comprises wing panels 80, 82, forming wall 81, and hinged members 84, 85. Skirt forming panel 42 is capable of both rotational movement and transverse movement, relative to frame member 35, about the axis that is created by hinged members 84, 85. Of course, various skirt form panel configurations having a fewer or greater number of forming panels, or even designs, integrated into the forming panels, are also contemplated.

Figure 9A:
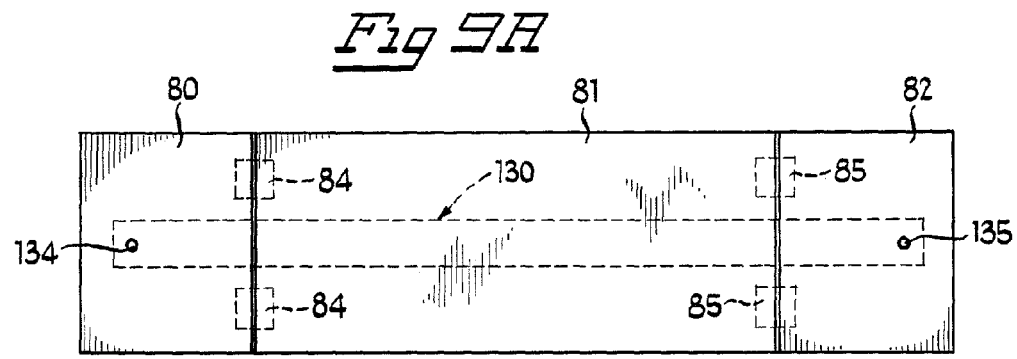
Figure 9B:
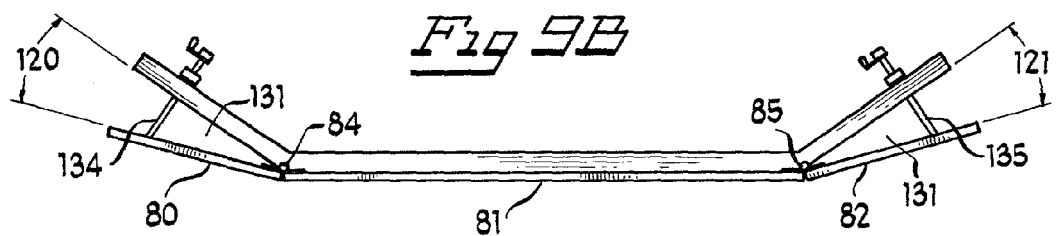

Skirt forming panel 42 is preferably configurable into a variety of different structural positions to fulfill a variety of customized bathroom needs. In order to do so, and as shown in FIGS. 9, 9A and 9B, wing panels 80, 82 are hingeably connected to forming wall 81 via hinged members 84, 85. Thus, both wing panels 80, 82 are capable of planar rotational motion relative to forming wall 81, which can then increase or decrease hinge angles 120, 121 therebetween. This hinged connection allows for any number of angled panel configurations to be made, allowing for completely customizable bathtub designs. These designs may include a substantially flat wall, or an extremely angled wall, depending upon cosmetic and practical needs.

However, during the formation process, forming panel 42 is placed under a great deal of stress, which in turn places stress on wing panels 80, 82 and forming wall 81. This stress could cause wing panels 80, 82 to hinge out of the desired position, altering the final desired shape of the product. Therefore, skirt-forming panel 42 additionally includes support member 130 affixed to forming wall 81, and support bolts 134, 135 extending from support member 130 to and through wing panels 80, 82. Support member 130 comprises a substantially straight and rigid structural girder made from a material having significant structural weight-bearing capacity, such as steel. Support member 130 is welded to the length of forming wall 81 as shown in FIG. 9, and then is angled out and away from wall at support angle 131. Because of the stress placed on forming panel 42, there are practical limitations on the maximum angle that wing panels 80, 82 may hinge from forming wall 81. Support angle 131 represents the maximum angle that wing panels 80, 82 can extend from alignment with forming wall 81. Therefore, wing panels 80, 82 have a maximum hinge angle 120, 121 at support angle 131.

In order to provide intermediate angles, that is angles between support angle 131 and a hinge angle of zero degrees, support bolts 134, 135 are secured to wing panels 80, 82 on one end, and to support member 130 on the other end. Support bolts 134, 135 may then be used to adjust the distance between wing panels 80, 82 and support member 130. The end of support bolts 134, 135 may generally be secured to any part of wing panels 80, 82. However, it is preferred that support bolts 134, 135 actually pass through wing panels 134, 135, as shown in FIG. 10, and are counter sunk into the front face of those panels. The counter sinking of the bolts 134, 135 allows the bolts to provide a great deal of support, as well as providing an area for the bolts to be adjusted (as explained below). Additionally, the counter sinking of bolts 134, 135 allows the distance between wing panels 80, 82 and support member 130 to be adjusted, while ensuring that bolts 134, 135 do not leave marks on the newly formed tub.

On the opposite end, support bolts 134, 135 are associated with support member 130 to provide support for wing panels 80, 82, during the formation process. Preferably, support bolts 134, 135 actually pass through support member 130, through a slot-like path called the slide path 140. As support bolts 134, 135 are tightened or loosened, hinge angles 120, 121 are changed, which, in turn, change the relative angles of wing panels 80, 82 to support member 130. This change in angle alters the interaction angle of support bolts 134, 135 with support member 130. In order to accommodate the change in angles, support bolts 134, 135 are allowed to move within slide path 140. However, support bolts 134, 135 should be secured in order to maintain the appropriate hinge angles 120, 121. Therefore, and as shown in FIG. 11, skirt forming panel 42 may additionally include sliding toggle nut 150 suspended within suspension member 155, both of which are described more detail below. Suspension member 155 and sliding toggle nut 150 allow for the angle changes caused by the tightening and loosening of support bolts 134, 135, while maintaining a standard distance between support member 130 and wing panels 80, 82.

Of special interest to this structure is sliding toggle nut 150 and suspension member combination shown in FIG. 11. Sliding toggle nut 150 is shown suspended in suspension member 155, which is in turn affixed to support member 130. Toggle nut 150 includes two suspension holes 151, 152, located on opposite sides of nut 150, into which suspension pins 153, 154 are inserted to support nut 150 in member 155. Specifically, suspension pins 153, 154 preferably comprise a straight pin having a head, so that toggle nut 150 can adjust back and forth as needed, while maintaining the distance between support member 130 and wing panels 80, 82.

Suspension member 155 additionally includes side slots 156, 157, through which securing screws 158, 159 affix suspension member 155 to support member 130. As support bolts 134, 135 are adjusted so as to increase/decrease hinge angles 120, 121, the position and angle of bolts relative to support member 130 changes. Slide path 140 allows support bolts 134, 135 to shift position relative to support member 130, while sliding toggle nut 150 ensures that support member 130 secures the hinge angles 120, 121.

Although the above disclosure is couched in terms of adjusting both wing panels 80, 82, it is possible that only a single wing panel is hingedly attached, or that only a single winged panel exists. Any number of configurations, including additional wing panels, or reduced numbers of wing panels, may be implemented without deviating from the scope of this invention. Further, the adjustment of a single hinge angle, for example hinge angle 120, does not necessarily affect the corresponding hinge angle 121. Thus, a configurable forming panel 42 is disclosed, which may be customized to any number of bathroom needs, and then incorporated into the present formation apparatus.

Stretching means 44 is shown in FIG. 1 as comprising hydraulic cylinders (not shown), which force skirt-forming member 24 transversely along support beam members 38, 39. Stretching means 44 facilitates movement of skirt forming member 24 away from frame member 35. It is also contemplated that stretching means comprise a manually (hand) operated lever, as well as an electric system.

Skirt clamping means 46 is shown in FIG. 6 and FIG. 7 as comprising protector panels 87, 88, 89 and clamps 90, 91, 92. The protector panels 87, 88, 89 are positioned over panels 80, 82, and formation wall 81, sandwiching skirt region 63 of formable member 11, therebetween. The protector panels are maintained in a desired position by clamps 90, 91, 92. Of course, single protector panels configured to match the skirt frame member, as well as multiprotector panels are also contemplated. Additionally, the protector panel may also be carved such that once positioned, the formable member could eventually be molded to the carved shape of the protector panel.

Plumbing apparatus 14 is shown in FIG. 1 and FIG. 8 as comprising plumbing fixture 26, manifold 28 (FIG. 8), means 110 for forming a non-slip surface, means 112 for precluding inadvertent contact, drawing means 31 and means 32 for cooling formable member 11. Plumbing fixture 26 may comprise a conventional porcelain, cast iron, or the like, bathtub or shower stall, having outer rim 48, interior surface 50, bottom surface 52, overflow outlet 54 and drain 56.

Manifold 28 comprises a series of tubes, such as tube 29, and junction member 95. Manifold 28 is positioned above bottom surface 52 of plumbing fixture 26. Each tube, such as tube 29 includes holes, such as hole 94 extending through tube 29. Junction member 95 includes outlet opening 96. Each tube, such as tube 29, is operably associated with junction member 95. While other shapes, sizes and relative distances are contemplated, the holes are circular and positioned approximately two inches away from each other, so as to facilitate uniform drawing of formable member toward plumbing fixture 26. It is also contemplated that the manifold comprise a series a holes through bottom surface of plumbing fixture 26 having junction member 95 below the bottom surface of plumbing fixture 26.

Means 111 for precluding inadvertent contact and means 110 for forming a non-slip surface comprise mesh surface 30 of plumbing apparatus 14. The mesh surface comprises a diamond-shaped mesh extending over manifold 28, positioned on bottom surface 52 of plumbing fixture 26. Means 111 for precluding inadvertent contact, and, in turn, mesh surface 30 protect manifold 28 from inadvertent contact with formable member 11, while not covering the openings contained thereon. Means 110 for forming a non-slip surface, and, in turn, the mesh surface additionally provide for the formation of the diamond mesh pattern on at least portion of the formable member. While the mesh is of a uniform repeating diamond-shaped configuration, other configurations are certainly contemplated.

Means 31 for drawing air through outlet opening 96 comprises vacuum means 97 and hose 99. Hose 99 is connected to outlet opening 96 at one end and to vacuum means 97. Vacuum means 97 may comprise an electric pump of the proper power to create enough of a vacuum to draw the formable member toward the tub.

Means 32 for cooling formable member comprises forcing ambient air through hose 99 into manifold 28 to reduce the temperature of formable member 11 and plumbing fixture 26. This may be achieved by reversing vacuum means 97. It is also contemplated that the cooling means may also comprise fans positioned proximate plumbing fixture 26 that force air directly toward interior surface 50 of plumbing fixture 26.

Plumbing apparatus movement means 16 is shown in FIG. 1 and FIG. 2 as comprising lift means 101 and base member 102. Plumbing apparatus movement means 16 is positioned under positioning means 20 and is adjustable from a lowered position, wherein the lift means is fully collapsed, to a raised position, wherein outer rim 48 of plumbing fixture 26 is coplanar with formable member 11. Lift means 101 comprises a conventional hydraulic "scissor" lift—although other lifting mechanisms are also contemplated. Base member 35 comprises a substantially horizontal surface that is operably attached to lift means 101. Plumbing fixture 26 is releasably positioned on base member 102. The weight of plumbing fixture 26 precludes inadvertent movement of plumbing fixture 26 relative to base member 102 without additional mounting.

In operation, and prior to initiation of the process for formation of the tub, an operator must determine the optimum hinge angles for wing portions 80, 82. Once determined, support bolts 134, 135, are adjusted so that skirt forming panel 42 can be used to produce the desired, angled side walls.

Thereafter, and as seen in FIG. 2, formable member 11 is positioned on frame member 35. Specifically edges 60, 61, 62 are positioned into frame edge members 64, 65 and 66 respectively, while region 63 is positioned over frame support member 67. Hydraulic clamp 36 is engaged over edges 60, 61, 62 and flat plate member 34 is positioned over region 63 to retain formable member 11 in a desired orientation to, in turn, prevent inadvertent movement of the formable member relative to the frame member.

Further, as seen in FIG. 6 and FIG. 7, formable member 11 is also releasably attached to skirt forming member 24. Specifically, protector panel 88 is positioned over forming panel 81, sandwiching formable member 11 therebetween. Protector panel 88 is prohibited from movement by the attachment of clamp 91 (FIG. 6). Inasmuch as the formable member, prior to heating, is not malleable, protector panels 87, 89 are not installed at the same time as panel 88 is installed over formable member 11 (FIG. 6).

Upon positioning in the desired orientation, frame member 35, skirt-forming member 24 and, in turn, formable member 11 are rolled along support members 38, 39 through opening 75 of oven 72. The upper burner (not shown) and lower burners 73 respectively heat formable member 11 until at least region 63 of formable member 11 is sufficiently malleable to facilitate sandwiching of formable member 11 between protector panels 87, 89 and wing panels 80, 82. Clamps 90, 92, like clamp 91, are positioned to retain protector panels in the proper orientation (FIG. 7).

Formable member 11 is further heated in oven 72 to a desired elevated temperature. Once the formable member has reached the desired temperature, frame member 35, skirt-forming member 24, and, in turn, formable member 11 are positioned over plumbing apparatus 14. Skirt forming panel 42 is then rotated about hinged members 84, 85 until the skirt-forming panel 42 is in a substantially vertical orientation. Once locked in the vertical position, the forming panel is transversely moved away from frame member 35, to stretch skirt region 63 of formable member, to, in turn, eliminate any surface imperfections on the formable member that may have been introduced through rotation of skirt forming panel 42 about hinged members 84, 85.

Next, plumbing apparatus 14 is lifted via lift means 101 until upper rim 48 of plumbing fixture 26 is in uniform contact with formable member 11. Vacuum means 97 (FIG. 2), which is connected to manifold 28 (FIG. 8), is activated to remove air from the interior of plumbing fixture 26. As the air is evacuated, formable member 11 is drawn toward and into contact with interior surface 50 of plumbing fixture 26 and mesh surface 30 (FIG. 1 and FIG. 8) on the bottom surface 52 of plumbing fixture 26 (FIG. 8). Once substantially all of the air has been evacuated, formable member 11 has generally taken on the configuration of the interior surface 50 of plumbing fixture 26, including any specific openings of the tub, such as overflow outlet 54 and drain 56. Further, due to contact with mesh surface 30, a raised diamond surface configuration 130 is formed in formable member 11 (FIG. 4 and FIG. 5), which also serves to create a "non-slip" surface on the bottom of the formable member (now the formed liner).

Prior to removal of formable member 11, which now conforms fully to the shape of plumbing fixture 26, from the bathtub liner vacuum forming system 10, ambient air is forced by vacuum means 97 operating in reverse at a lower pressure through hose 99, eventually emanating from holes such as hole 94 (FIG. 8) in tube 29 of manifold 28, to reduce the temperature of formable member. While the pressure of this ambient air is insufficient to alter the shape of the now formed formable member (FIG. 4 and FIG. 5), the air will cool formable member 11 such that it may be removed from bathtub liner vacuum forming system 10 by hand (FIG. 4 and FIG. 5).

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

We claim:

1. A customizable skirt-forming member, comprising:
    a rigid forming wall;
    at least one adjustable wing hingeably connected to each distal ends of the forming wall, wherein the at least one adjustable wing includes a first adjustable wing and a second adjustable wing;
    the pitch of the first wing and the second wing relative to the forming wall forming a hinge angles therebetween;
    a support member affixed to a rear side of the forming wall, wherein the support member extends outwardly from and at a support angle to the forming wall, wherein the hinge angle cannot be greater than the support angle; and
    means for altering the pitch of the at least one wing, relative to the forming wall, so as to simultaneously alter the hinge angle therebetween.

2. The device according to claim 1, wherein the altering means comprises at least one support bolt affixed to the at least one adjustable wing on a first end, and extending to and through the support member on a second end.

3. The device according to claim 2, additionally comprising a sliding toggle nut affixed to and securing the second end of the support bolt at the support member.

4. The device according to claim 2, the at least one adjustable wing having a back side and a forming side, wherein the support bolt extends through the back side, and is counter-sunk into the forming side.

5. The device according to claim 1, wherein the pitch of both the first wing and the second wing may be independently altered.

6. The device according to claim 1, wherein the support angle is maximum angle the wings can hinge from the forming wall.

7. A customizable skirt-forming member, comprising:
a rigid forming wall;
at least one adjustable wing hingeably connected to each distal ends of the forming wall, wherein the at least one adjustable wing includes a first adjustable wing and a second adjustable wing;
the pitch of the first wing and the second wing relative to the forming wall forming hinge angles therebetween; and
a support member affixed to a rear side of the forming wall, wherein the support member extends outwardly from and at a support angle to the forming wall; and
means for altering the pitch of the at least one wing, relative to the forming wall, so as to simultaneously alter the hinge angle therebetween, wherein the altering means comprises at least one support bolt affixed to the at least one adjustable wing on a first end, and extending to and through the support member on a second end.

8. The device according to claim 7, wherein the hinge angle cannot be greater than the support angle.

9. The device according to claim 7, additionally comprising a sliding toggle nut affixed to and securing the second end of the support bolt at the support member.

10. The device according to claim 7, the at least one adjustable wing having a back side and a forming side, wherein the support bolt extends through the back side, and is counter-sunk into the forming side.

11. The device according to claim 7, additionally comprising a sliding toggle nut affixed to and securing the second end of the support bolt at the support member.

12. The device according to claim 7, the at least one adjustable wing having a back side and a forming side, wherein the support bolt extends through the back side, and is counter-sunk into the forming side.

* * * * *